C. F. CORBETT.
DEVICE FOR EXPANDING AND CONTRACTING DEMOUNTABLE RIMS.
APPLICATION FILED OCT. 14, 1915.
1,220,321.
Patented Mar. 27, 1917.
2 SHEETS—SHEET 1.
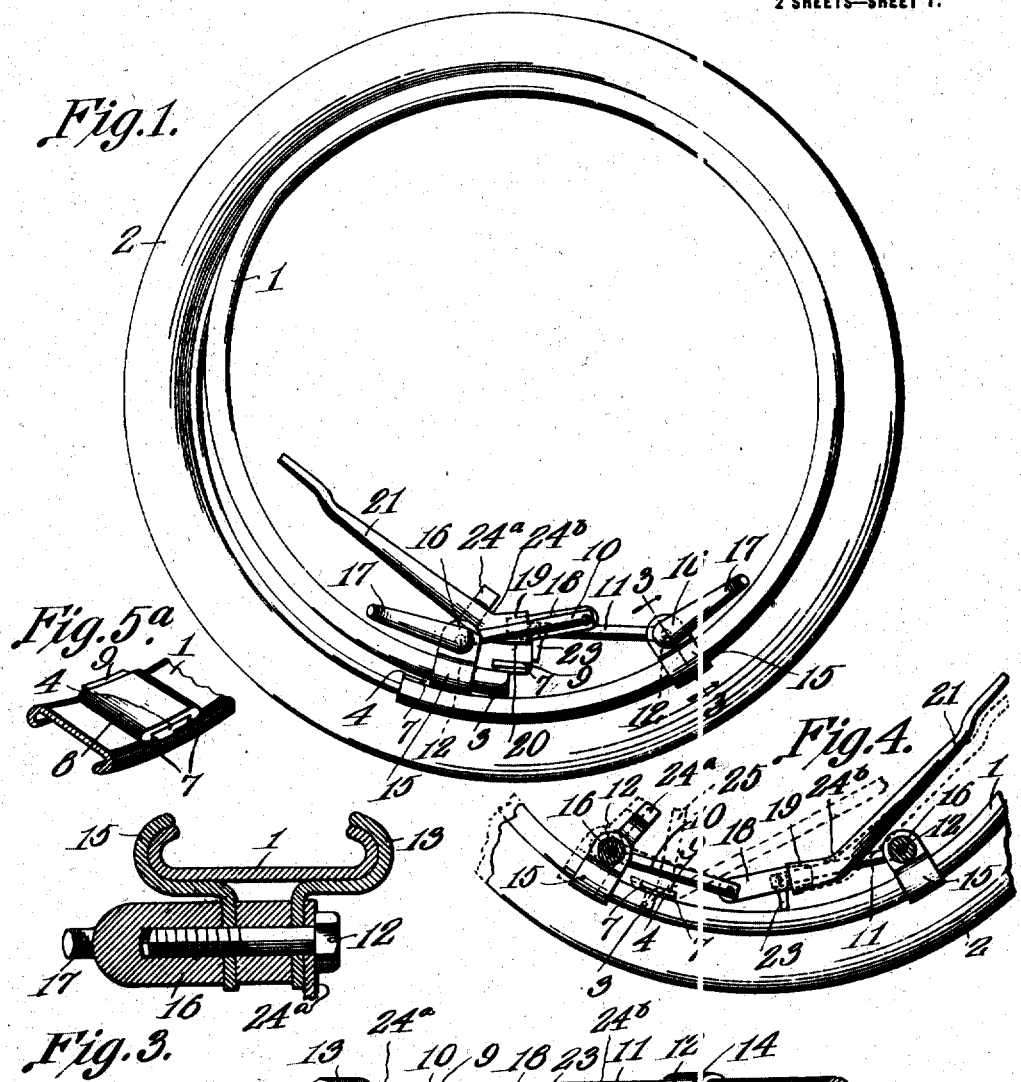
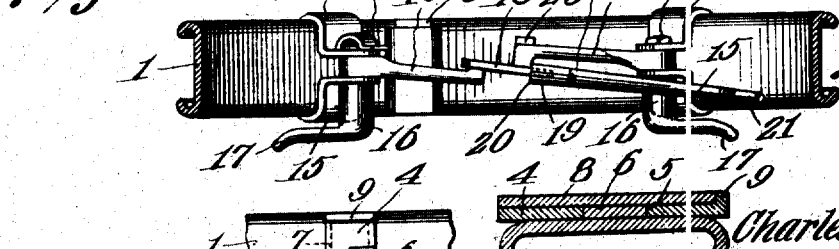
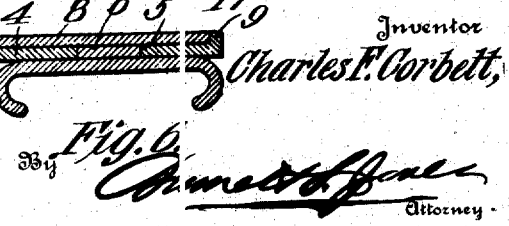
Inventor
Charles F. Corbett,
Witnesses
James F. Crow,
C. C. Hines.
By
Attorney.

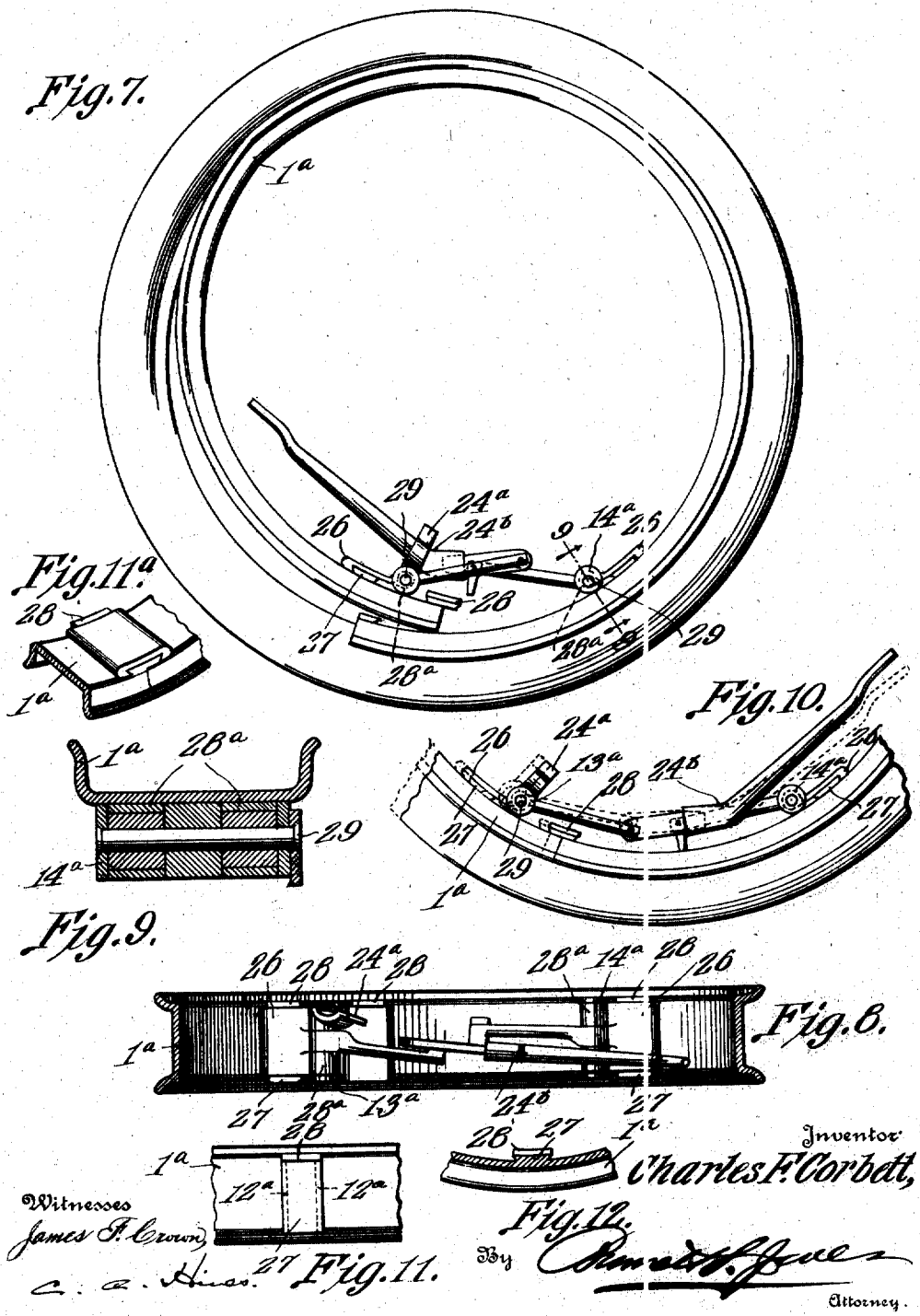

UNITED STATES PATENT OFFICE.

CHARLES F. CORBETT, OF CLEAR SPRING, MARYLAND.

DEVICE FOR EXPANDING AND CONTRACTING DEMOUNTABLE RIMS 1,220,321.  Specification of Letters Patent.  Patented Mar. 27, 1917.

Application filed October 14, 1915. Serial No. 55,892.

*To all whom it may concern:*

Be it known that I, CHARLES F. CORBETT, a citizen of the United States, residing at Clear Spring, in the county of Washington and State of Maryland, have invented certain new and useful Improvements in Devices for Expanding and Contracting Demountable Rims, of which the following is a specification, reference being had therein to the accompanying drawing.

My invention relates to improvements in devices for expanding and contracting demountable rims of automobile and other vehicle wheels, and particularly rims of that type in which the rim is split at one point in its circumferential length and provided with means for holding it connected at the point of severance to maintain it in normally expanded condition to receive and hold the resilient tire.

One object of the present invention is to provide novel means for "breaking" or disconnecting an expanded rim and contracting it for the removal of the tire, and for also subsequently reëxpanding the rim to receive the tire.

With these and other objects in view, the invention consists in the features of construction and combination and arrangement of parts hereinafter more fully described, reference being had to the accompanying drawings, wherein—

Figure 1 is a view in side elevation of a vehicle rim of the clencher type and tire embodying the invention, showing in full lines the parts of the expanding and contracting device in joint and breaking condition;

Fig. 2 is a sectional plan view of the rim and contracting and expanding device;

Fig. 3 is a vertical transverse section on the line 3—3 of Fig. 1;

Fig. 4 is a longitudinal section, showing in full and dotted lines particularly the joint breaking action prior to the expansion of the rim;

Fig. 5 is a detail view, showing the means for locking the rim ends together;

Fig. 5ª is a detail perspective view, showing the locking connection between the ends of the rim;

Fig. 6 is a detail transverse section on the line 6—6 of Fig. 5;

Figs. 7, 8, 9 and 10 are views similar to Figs. 1 to 4, inclusive, showing the application of the invention to a different form of rim, and also showing a modified construction;

Fig. 11 is a fragmentary plan view, showing one of the dovetailed retaining lugs on the rim; and Fig. 11ª is a detail view, showing the construction of the fastening between the rim ends disclosed in Figs. 7 to 10 inclusive;

Fig. 12 is a detail section on the line 12—12 of Fig. 11.

In the present embodiment of my invention, as shown in Figs. 1 to 6 inclusive, 1 designates a demountable rim of the clencher type, and 2 a pneumatic tire mounted thereon, the rim being split or provided with a transverse slit 3 at a point in its circumference, whereby it is adapted to be contracted to permit of the ready and convenient application and removal of the tire, and expanded to support the tire. It will, of course, be understood that the rim is one of the several demountable types commonly used in connection with automobile and other vehicle wheels.

I also provide means for interlocking the meeting ends of the split rim, which means comprises a retaining plate 4 upon one end of the rim which projects beyond such end of the rim and has its projecting end formed with a slot 5 to receive a retaining lug 6 on the other end of the rim, the outer transverse end of said rim and plate being dovetailed, as shown at 7, to receive a sliding locking plate or member 8, which is adapted to be applied and removed from one side of the rim and to abut against a stop flange or shoulder 9 when in fully applied position. This locking connection serves as a safeguard to obviate any liability of accidental disconnection or displacement of the ends of the rim when in service.

The means for expanding and contracting the rim comprises a pair of toggle links 10 and 11, which are pivotally connected at their relatively outer ends to transverse bolts 12 arranged on opposite sides of the cleft 3 and forming elements of a connector 13 and 14. Each of these connectors consists, as shown, of a pair of clamping jaws or members 15 arranged to grip opposite sides of the rim and provided with ears between which the said outer ends of the links are received and which are perforated for the passage of the bolts 15. Each of these bolts is threaded to receive a nut 16 provided with an actuating handle or lever 17 for turning the same on and off, it being understood that in practice any suitable form of fastening means may be employed to prevent the nut from becoming casually disconnected. The connectors or clips 13 and 14 serve as a means adapting the expanding and contracting device for application to different sizes and species of rims of the character set forth, rendering the device applicable to the demountable rims of wheels in use, either of the clencher or quick demountable type. While these detachable connectors are shown and preferably employed, it is evident that any other suitable means for permanently or temporarily connecting the links to the rim may be employed.

The relatively inner ends of the links are pivotally coupled by an actuating lever 18 which has a tapered free end portion 19 to receive a tapered socket 20 upon one end of an operating handle or lever 21, which socket is bent or arranged as shown at an obtuse angle to the lever. By means of this handle or lever the actuating lever 18 may be swung in one direction to a position, as indicated in full lines in Fig. 1, to move or draw the links inwardly to contract and hold the rim contracted, or the lever may be swung in the opposite direction to move the links apart and thereby expand the rim, as shown in Fig. 4.

As shown in full lines in Fig. 4, in which the parts appear in their normal position with the rim expanded and locked by the fastening means in such position; it will be noted that the handle 21 is arranged at one side of the rim with the links in closed position, and with the lever 18 arranged at an angle to both links, so that the handle 21 may be applied easily to the tapered end 19 of the lever which extends at one side of and to an extent inwardly from the adjacent link 11. A stop lug 23 is carried by the link 11 to abut against the rim when the parts are in closed position, to maintain them in the stated relationship, and in such a position that the handle 21 may be moved toward the adjacent side of the rim sufficiently to straighten out the link 10, in order that the ends of the rim may be preliminarily spread upon the removal of the plate 8, prior to the rim contracting operation. The lug 23 also serves in this operation as a rest or support for the link 11 and on which the lever 18 may swing as a fulcrum, so that ample leverage may be secured to straighten out the link 10 and lever 18 to spread the ends of the rim apart, as indicated in dotted lines in Fig. 4, so as to permit a suitable tool to be employed, as hereinafter described, to pry the rim ends apart and out of alinement before the contracting operation. The purpose of disposing the socket 20 at an angle to the handle 21 is to render the handle reversible, as well as detachable, so that it may be applied in position to clear the connector 14 and operated to swing the lever 18 over to the other side or to partially open position, and then reverse or turn half-way around to fully throw the lever and to adapt it to clear the connector 13 in subsequently moving the lever back to closed position, the angular arrangement of the handle with respect to the socket permitting it also to move close to the rim in the back-and-forth adjustment of the lever 18.

In the use of the device, the handle 21 is applied to the lever as shown in full lines in Figs. 2 and 4, and preliminarily moved from the full line position shown in Fig. 4 to the dotted line position shown in Fig. 4, whereby the links are partially opened and force the end of the rim to which the link 10 is attached away from the other end of the rim, allowing a suitable prying tool 25 to be applied to move the first-named end of the rim inwardly or radially out of alinement with the opposite end of the rim. The handle 21 may thereupon be swung toward the opposite side of the rim, as shown in Fig. 1, to break or swing the links inwardly to a position beyond center, whereby the rim will be contracted and the links locked in contracted condition, so that the tire may be removed or applied with ease and facility. To add security to the locking connection, however, a spring latch member 24$^a$, secured to the adjacent bolt 12, may be employed, said latch having an offset or hooked portion to engage the handle 21 and an angularly disposed end portion 24$^b$ arranged in the path of the handle, so that the spring latch is disposed to snap into and out of locking position, the latch holding the handle 21 from disengagement from the lever 18 while the operator is working upon the wheel. It is understood that before this operation is carried out the locking plate or member 8 is detached so as to permit separation of the rim ends. When it is desired to expand the rim again, this is effected by moving the handle back to its normal position, and after the rim ends are then brought again into abutting relation the locking plate may be applied. If desired, however, this locking plate may be omitted when its use is not desired or deemed essential.

In the modified form of my invention illustrated in Figs. 7 to 12, inclusive, the same general structure is employed, but in this adaptation of the invention I have shown the application of the same to a "straight-edge" demountable rim 1$^a$. In this form of the invention, clips or connectors 13$^a$ and 14$^a$ are employed in lieu of the connectors 13 and 14, and each of these clips or connectors 13$^a$ and 14$^a$ comprises a connector plate 26 having flanges forming a dovetailed socket to receive and engage a dovetailed lug 27 formed or provided upon the adjacent end of the rims, said plate 26 being slidably applicable and removable from one side of the rim and being limited from excess movement when in applied position by a stop flange 28. Each connector plate 26 is provided with a loop 28ª to receive a pivot pin 29 upon the end of the connecting link, such construction providing also detachable connection between the links and the rim, which form of detachable connection may be employed when desired.

It will be evident from the foregoing description that my invention provides a simple, reliable and efficient means for expanding and contracting demountable rims so as to permit of the ready, easy and efficient application and removal of the tire, without shifting the elements to an inoperative position or to such a position as to cause them to be arranged to resist free movements when properly operated. Furthermore, it will be seen that the invention provides a construction of device of this kind which is detachable or permanently applicable to different styles of rims, and also provides a means in the form of the operating handle for securing maximum movements of the actuating lever, and also means for locking the ends of the rim against liability of casual displacement or disconnection when in service.

I claim as my invention:

In a rim spreader, the combination with clamps for engaging the adjacent ends of a split rim, of toggle mechanism for operating the clamps consisting of links connected to the clamps, a lever connecting the links, and a fulcrum projection engaging one end of the rim during the expanding movement of the links to hold the said rim end down and permitting the opposite rim end to rise freely.

In testimony whereof I hereunto affix my signature in the presence of two witnesses.

CHARLES F. CORBETT.

Witnesses:
GEORGE W. PUTNAM,
CHARLES SILVESTER.